UNITED STATES PATENT OFFICE.

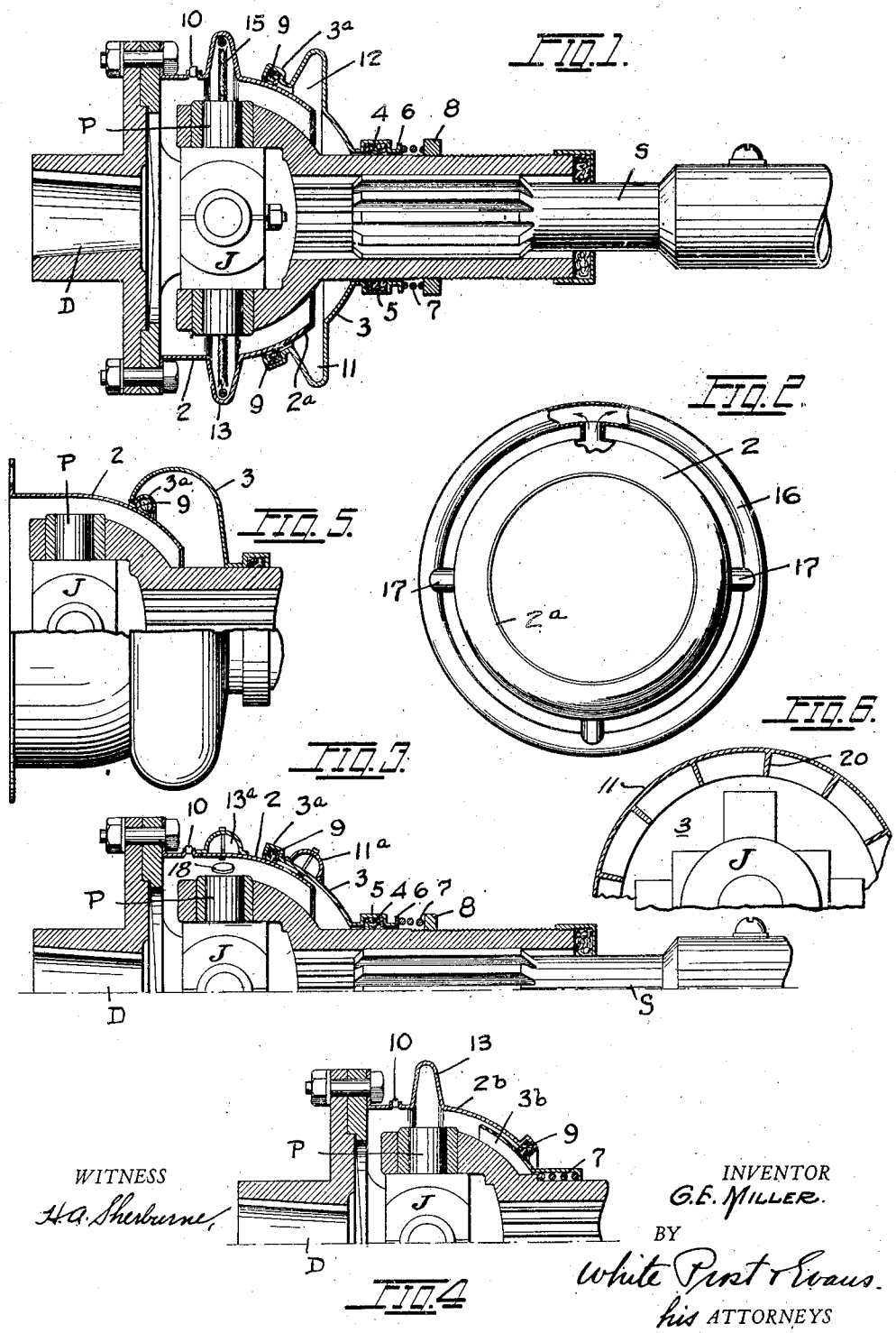

GEORGE EDWARD MILLER, OF OAKLAND, CALIFORNIA.

UNIVERSAL-JOINT OIL-BOX.

1,382,528.  Specification of Letters Patent.  Patented June 21, 1921.

Application filed October 14, 1920. Serial No. 417,001.

*To all whom it may concern:*

Be it known that I, GEORGE EDWARD MILLER, a citizen of the United States, and a resident of Oakland, county of Alameda, and State of California, have invented a certain new and useful Universal-Joint Oil-Box, of which the following is a specification.

This invention relates to oil guards and dust boxes particularly of the character used in combination with universal joints of various machines and vehicles.

A common type of dust guard and oil for universal joints of driving and propeller shafts of vehicles consists of two concavo-convex or hemispherical sections having mutually bearing portions that are generally provided with a packing. The box sections are respectively connected to the driving shaft and the propeller shaft which are joined by a universal joint; the box forming an oil containing chamber and also forming a dust guard for the universal joint inclosed.

It is an object of the present invention to provide means for preventing the waste and outward flow of oil under centrifugal force between the running joint of the mutually bearing portions of the sections of the oil box.

It is at the same time an object of the invention to provide means on each section of the box capable of receiving and holding the oil that is thrown outwardly by centrifugal force and yet permitting the oil to be liberally applied to the running joint mechanism within the oil box.

It is further an object of the invention to provide a device of this kind that is at once simple, practicable, and that does not materially increase the cost of construction or sale price of the joint box. It is also an object to provide means forming substantially fixed parts provided on or formed integrally with the respective sections of the box so as to obviate extraneous fastening means and other loose devices or attachments and further to provide oil collecting means that will have substantially the same life as the box sections themselves.

The invention possesses other objects and features of advantage, some of which with the foregoing, will be made manifest in the following description of the preferred forms of the invention which are illustrated in the drawings accompanying and forming part of the specification. It is to be understood that it is not intended to limit the invention to the embodiments shown by the said drawings and description as variations may be adopted within the scope of the invention as set forth in the claims.

Referring to the drawings:

Figure 1 is a central longitudinal section through the preferred form of the device.

Fig. 2 is a transverse sectional view showing a modified form of the device.

Fig. 3 shows collecting means applicable to existent box structures. Figs. 4 and 5 show modified forms. Fig. 6 shows discharge plates.

While the invention may be embodied in a variety of forms, a preferred construction is that in which the box-forming sections of the housing adapted to inclose a universal joint are each provided with an oil retaining or collecting means preferably so disposed as to intercept the oil as it is thrown centrifugally during the rotation of the universal joint and the box and thus prevent the passage of the oil to the running joints at which the sections bear upon each other and thus prevent loss of oil through the joints.

In the construction shown in Fig. 1 of the drawings the dust guard and oil box comprises a substantially hemispherical casing formed of two sections 2 and 3 the former of which is suitably attached to convenient means on the adjacent end of the drive shaft D, as for instance, of an automobile. The box section 3 which is in the form of a segment of a sphere has a contracted neck portion embracing the propeller shaft S; the said portion being provided to receive a packing ring 4. Sleeve part 5, in which the packing ring 4 is arranged, may be provided with an end flange 6 to engage a spring 7 the pressure of which is controlled by an adjustable nut or collar 8 on the shaft S and which spring serves to press a section 3 of the box toward the complementary spherical flange portion $2^a$ of the box section 2.

The ends of the shafts D and S are connected by a universal joint structure J of any suitable character and during operation of the shaft sections D and S any relative angular change of position of the axes of the shaft is compensated for by the sliding movement of the box section 3 upon the complementary section 2. Preferably the box section 3 is provided with a flange portion 3ᵃ in which there is arranged any suitable packing material 9.

Ordinarily the oil box 2—3 is filled with a lubricant through a filling aperture 10 and during the rotation of the shaft the centrifugal force generated tends to drive the lubricant through the running joint at the packing 9 between the flanges 2ᵃ and 3ᵃ of the box sections.

To obviate leakage and waste of lubricant the present invention comprises means on either or both of the sections 2—3 of the box serving to prevent the direct flowing of the oil or lubricant under centrifugal force through the running joint. This object may be accomplished by the provision of an annular ring or pocket 11 provided or formed on the section 3, for instance, the pocket having its inner mouth 12 arranged close to the inner edge of the flange 3ᵃ, so that any oil creeping outwardly on the outer surface of the flange 2ᵃ will be directed into the pocket 11 and held there during the rotation of the parts.

Similarly the box section 2 may be provided with an annular ring or pocket forming portion 13 having an annular mouth opening freely into the chamber of the box. If desired oil conveying means may be provided to conduct oil from the lower portion of the pocket 13 or of the pocket 11 to the mechanism within the oil box. Such oil conducting means may comprise a wick 15 which is here shown as extended through a centrally bored universal joint pin P.

A slightly modified form of the device is shown in Fig. 2 as comprising an annular tube 16 which is connected to the respective box section as by radial tubes 17.

A further modification is shown in Fig. 3 in which the sections are provided with applied circumferential channel rings 11ᵃ and 13ᵃ. The rings may be soldered and riveted in place over series of port holes 18 in the box sections.

In Fig. 4 the packing ring is arranged in the outer casing member 2ᵇ which rides over the inner casing member 3ᵇ, the former having the circumferential oil collecting chamber 13.

Preferably the capacity of the oil collecting means is such that during the rotation the oil mass when thrown into the collecting channels, will be beyond the joint line between the casing parts.

Fig. 5 shows a form of box section in which the packing 9 is retained within the outer bowed portion of the box section.

Fig. 6 is a detail sectional view showing radial discharge blades or plates 20 in an annular pocket. Either the plates or the wall with perforations 18, Fig. 3, will serve to shower the oil from the annular pockets as the speed of the rotating mechanism falls.

What is claimed is:

1. A universal-joint dust guard and oil box having spherical bearing sections, and oil holding means circumferentially beyond the bearing surface of said sections and into which the oil is thrown by centrifugal force and contained well beyond the meeting joint of said sections to prevent its being forced past the running joint of the sections.

2. A universal-joint dust guard and oil box having spherical bearing sections, oil holding means into which the oil is thrown by centrifugal force to prevent its being forced past the running joint of the sections, and a wick-like device for conveying oil from the holding means.

3. A universal-joint dust guard and oil box having sections bearing on each other at spherical portions, and means extending beyond the body of the spherical portions to catch and to prevent the flow of oil into the bearing joint between the sections under centrifugal force.

4. A universal-joint dust guard and oil box having sections bearing on each other at spherical portions, and means on each portion to collect oil thrown centrifugally to prevent its being forced through the running joint of the sections.

5. A universal-joint dust guard and oil box having sections bearing on each other at spherical portions, and means on each portion to collect oil thrown centrifugally to prevent its being forced through the running joint of the sections, said means comprising annular pockets provided on the said sections.

6. A universal-joint dust guard and oil box having sections bearing on each other at spherical portions, and means on each portion to collect oil thrown centrifugally to prevent its being forced through the running joint of the sections, said means comprising annular pockets formed in the said sections.

7. A universal-joint oil box having mutual bearing flanges one of which has a circumferential collecting pocket communicating with the chamber of the box and independent of the bearing area of said flanges to hold oil thrown by centrifugal force.

8. A universal-joint box including sections bearing on each other to make a running joint, said sections each having means to collect oil thrown by centrifugal force.

9. A universal-joint box having sections with a packed running joint, and means at each side of the joint to collect oil thrown centrifugally, interiorly of the box.

10. A universal-joint dust guard and oil box having spherical bearing sections, and oil holding means into which the oil is thrown by centrifugal force to prevent its being forced past the running joint of the sections and means for showering the oil from the holding means as the speed of rotation falls.

11. A universal-joint dust guard and oil box having spherical bearing sections running one upon the other and rotative as a whole; one of the sections being provided with a circumferential outwardly extending groove portion which is independent of the running or meeting portions of the sections so as to collect and retain oil beyond the working zone of the meeting faces of the box.

12. A universal-joint dust guard and oil box having coöperative sections each provided with a spherical working face, and an outwardly projecting channel forming means extending beyond the spherical portions of the sections so as to collect and retain lubricant and prevent its flowing to the running joint between the sections while the box is rotating.

13. A universal-joint dust guard and oil box having coöperative sections each provided with a spherical working face, and an outwardly projecting channel forming means extending beyond the spherical portions of the sections so as to collect and retain lubricant and prevent its flowing to the running joint between the sections while the box is rotating, these sections having packing means at their meeting portions.

In testimony whereof I have hereunto set my hand.

GEORGE EDWARD MILLER.